(12) United States Patent
Hiraoka

(10) Patent No.: US 6,340,439 B1
(45) Date of Patent: Jan. 22, 2002

(54) DEPRESSURIZATION METHOD IN PLASTICIZATION AND METERING PROCESS FOR A MOTOR-DRIVEN INJECTION MOLDING MACHINE

(75) Inventor: Kazuo Hiraoka, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/334,670

(22) Filed: Jun. 17, 1999

(30) Foreign Application Priority Data

Jun. 17, 1998 (JP) .......................................... 10-169931

(51) Int. Cl.[7] .............................................. B29C 45/77
(52) U.S. Cl. ..................... 264/40.1; 264/40.5; 264/349; 366/78; 425/145; 425/582; 425/583; 425/587
(58) Field of Search .............................. 264/40.1, 40.4, 264/40.5, 4.07, 328.17, 349; 366/78; 425/582, 583, 587, 586, 145, 147

(56) References Cited

U.S. PATENT DOCUMENTS

| | | | | |
|---|---|---|---|---|
| 4,592,712 A | * | 6/1986 | Gutjahr | 264/40.3 |
| 4,615,669 A | * | 10/1986 | Fujita et al. | 425/147 |
| 4,718,841 A | * | 1/1988 | Kiya | 264/40.5 |
| 4,755,123 A | * | 7/1988 | Otake | 264/40.7 |
| 4,879,077 A | * | 11/1989 | Shimizu et al. | 264/40.1 |
| 5,028,373 A | * | 7/1991 | Taniguchi et al. | 264/328.1 |
| 5,756,037 A | * | 5/1998 | Kitamura | 264/328.1 |

FOREIGN PATENT DOCUMENTS

| | | |
|---|---|---|
| JP | 04-241918 | 8/1992 |
| JP | 9-174626 | 7/1997 |
| JP | 10-016015 | 1/1998 |

* cited by examiner

Primary Examiner—Jill L. Heitbrink
(74) Attorney, Agent, or Firm—Arent Fox Kintner Plotkin & Kahn, PLLC

(57) ABSTRACT

A motor-driven injection molding machine comprises an injection device which includes a heating cylinder for heating resin powder therein to melt the resin powder into molten resin and a screw disposed in the heading cylinder for feeding the molten resin in the heating cylinder forward to meter the molten resin. A controller positions, in response to a position detected signal detected by a position detector, the screw at a metering position using an injection servomotor on and immediately after completion of the plasticization and metering process. In addition, the controller rotates, in response to a pressure detected signal detected by a load cell, the screw in the opposite direction using a screw-rotation servomotor on and immediately after the completion of said plasticization and metering process to carry out depressurization of the molten resin in the heating cylinder that is metered ahead of the screw.

14 Claims, 6 Drawing Sheets

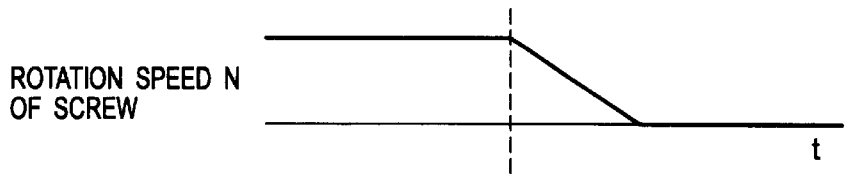
FIG. 3A PRIOR ART ROTATION SPEED N OF SCREW
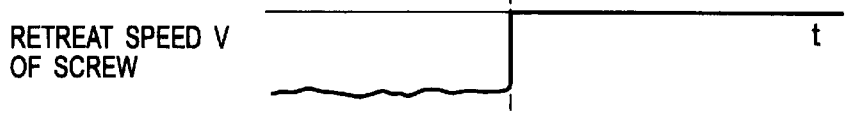
FIG. 3B PRIOR ART RETREAT SPEED V OF SCREW
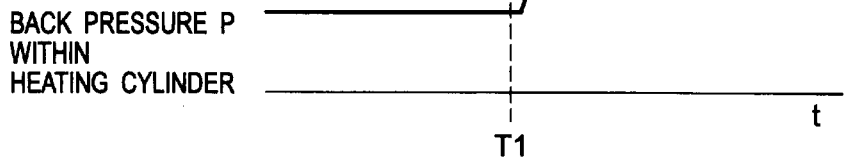
FIG. 3C PRIOR ART BACK PRESSURE P WITHIN HEATING CYLINDER
T1
FIG. 4A PRIOR ART ROTATION SPEED N OF SCREW
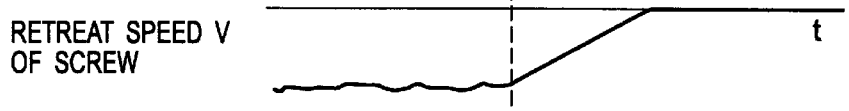
FIG. 4B PRIOR ART RETREAT SPEED V OF SCREW
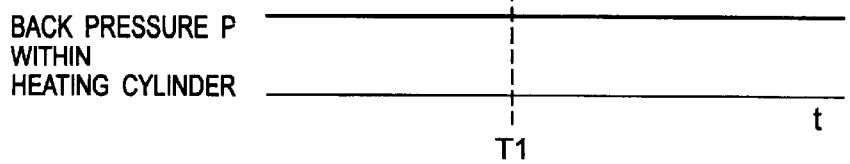
FIG. 4C PRIOR ART BACK PRESSURE P WITHIN HEATING CYLINDER
T1

DEPRESSURIZATION METHOD IN PLASTICIZATION AND METERING PROCESS FOR A MOTOR-DRIVEN INJECTION MOLDING MACHINE

BACKGROUND OF THE INVENTION

This invention relates to a motor-driven injection molding machine comprising an injection device which is driven by servomotors and, more particularly, to an improvement of a depressurization method in a heating cylinder in a plasticization and metering process.

In recent years, motor-driven injection molding machines have been widely used. The motor-driven injection molding machines uses, as actuators, servomotors in lieu of hydraulic actuators. Now, the description will proceed to operations of such an injection device using the servomotors as the actuators in brief.

(1) In the plasticization and metering process, a screw is rotated with a screw-rotation servomotor. The screw is located within the heating cylinder. Resin powder is fed, as fed resin, from a hopper to a rear portion of the screw in the heating cylinder. Rotation of the screw results in feeding the fed resin having a predetermined metered amount to a nose portion of the heating cylinder with the fed resin molten by the heating cylinder to form molten resin. During this time duration, the screw is retracted due to a pressure (back pressure) of the molten resin which is trapped in the nose portion of the heating cylinder.

The screw has a rear end portion which is directly connected to an injection shaft. The injection shaft is rotatably supported on a pressure plate through a bearing. The injection shaft is driven in an axial direction by an injection servomotor which is supported on the pressure plate. The pressure plate moves forward and backward along a guide bar in response to the operation of the injection servomotor through a ball screw. In the manner which will later become clear, the above-mentioned back pressure of the molten resin is detected by using a load cell and controlled with a feedback control loop.

(2) Subsequently, in a filling process, the pressure plate is advanced by means of driving the injection servomotor. The screw has a nose portion which serves as a piston to fill a mold with the molten resin.

(3) At the end of the filling process, the molten resin fills the while space within a cavity of the mold. At this point, the advancing motion of the screw has a control mode which is switched from a velocity control mode to a pressure control mode. This switching is referred to as a "V-P switching."

(4) After the V-P switching, the resin within the cavity of the mold is allowed to cool under a predetermined pressure. This process is called a dwelling process. In the dwelling process, the resin has pressure which is controlled in a feedback control loop in the similar manner which is described in conjunction with the above-mentioned back pressure control.

Subsequently, operation of the injection device returns back to the plasticization and metering process set forth in (1) after the completion of the dwelling process set forth in (4).

On the other hand, in a clamping device, an eject operation for ejecting a solid product out of the mold is carried out in parallel with the plasticization and metering process set forth in (1). The eject operation involves in opening the mold to remove the solidified product from the mold by means of an ejector mechanism and thereafter in closing the mold for the resin filling set forth in (2).

At any rate, it is important for the plasticization and metering process that high accuracy is achieved. This may be theoretically achieved by stopping the rotation of the screw with the screw positioned at a predetermined constant stroke position. However, in practice, it is difficult to achieve this in the manner which will later be described in conjunction with FIGS. 3A through 3C and 4A through 4C.

SUMMARY OF THE INVENTION

It is therefore an object of the present invention to provide a depressurization method for a plasticization and metering process of a motor-driven injection molding machine, which is capable of controlling back pressure within a heating cylinder and a position of a screw with high accuracy on and immediately after the completion of the plasticization and metering process.

Other objects of this invention will become clear as the description proceeds.

One aspect of this invention is directed to a depressurization method in a plasticization and metering process which is for a motor-driven injection molding machine comprising an injection device. The injection device comprises a heating cylinder for heating resin powder therein to melt the resin powder into molten resin, a screw disposed in the heading cylinder for feeding the molten resin in the heating cylinder forward to meter the molten resin, a screw-rotation servomotor operatively coupled to the screw for rotating the screw, and an injection servomotor operatively coupled to the screw for driving the screw along an axial direction to inject the molten resin metered in the heating cylinder forward. The injection device is provided with a load cell for detecting back pressure of the molten resin in the heating cylinder that is metered ahead of the screw to produce a pressure detected signal indicative of the back pressure and with a position detector for detecting a position of the screw to produce a position detected signal indicative of the position of the screw. The motor-driven injection molding machine comprises a controller for controlling, in response to the pressure detected signal and the position detected signal, driving of the screw-rotation servomotor and of the injection servomotor.

According to a further aspect of this invention, the above-understood depressurization method in the controller method comprises the steps of positioning, in response to the position detected signal, the screw at a metering position using the injection servomotor on and immediately after completion of the plasticization and metering process, and of rotating, in response to the pressure detected signal, the screw in the opposite direction using the screw-rotation servomotor on and immediately after the completion of said plasticization and metering process to carry out depressurization of the molten resin in the heating cylinder that is metered ahead of the screw.

In the above-mentioned depressurization method, the controller preferably may rotate the screw in the opposite direction until the back pressure indicated by the pressure detected signal is lowered to a predetermined pressure. Desirably, the controller may determines, in accordance with a pressure difference between the back pressure and the predetermined pressure, a rotation speed of the screw-rotation servomotor on making the screw rotate in the opposite direction. In addition, the controller preferably may restrict the rotation speed of the screw in the opposite direction to the upper limit thereof. Furthermore, the controller desirably may restrict a time interval for which the screw rotates in the opposite direction to the upper limit thereof.

A further aspect of this invention is directed to a controller which is for use in a motor-driven injection molding machine comprising an injection device. The injection device comprises a heating cylinder for heating resin powder therein to melt the resin powder into molten resin, a screw disposed in the heating cylinder for feeding the molten resin in the heating cylinder forward to meter the molten resin, a screw-rotation servomotor operatively coupled to the screw for rotating said screw, and an injection servomotor operatively coupled to the screw for driving the screw along an axial direction to inject the molten resin metered in said heating cylinder forward. The injection device is provided with a load cell for detecting back pressure of the molten resin in the heating cylinder that is metered ahead of the screw to produce a pressure detected signal indicative of a pressure detected value of the back pressure and with a position detector for detecting a position of the screw to produce a position detected signal indicative of a screw position detected value of the position of the screw. Responsive to the pressure detected signal and the position detected signal, the controller controls driving of the screw-rotation servomotor and of the injection servomotor through first and second motor drivers by supplying the first and the second motor drivers with first and second actuating commands, respectively.

According to a further aspect of this invention, the afore-understood controller comprises a reverse rotating arrangement connected to the load cell for rotating, in response to the pressure detected signal, the screw in the opposite direction by supplying the first actuating command to the first motor driver on and immediately after completion of a plasticization and metering process to carry out depressurization of the molten resin in the heating cylinder that is metered ahead of the screw, and a positioning arrangement connected to the position detector for positioning, in response to the position detected signal, the screw at a metering position by supplying the second actuating command to the second motor driver on and immediately after the completion of the plasticization and metering process.

BRIEF DESCRIPTION OF THE DRAWING

FIGS. 3A through 3C are timing charts for use in collectively describing an operation on and immediately after the completion of a plasticization and metering process in the conventional motor-driven injection molding machine illustrated in FIG. 1;

FIGS. 4A through 4C are timing charts for use in collectively describing another operation on and immediately after the completion of a plasticization and metering process in the conventional motor-driven injection molding machine illustrated in FIG. 1;

DESCRIPTION OF THE PREFERRED EMBODIMENT

Figure 1:
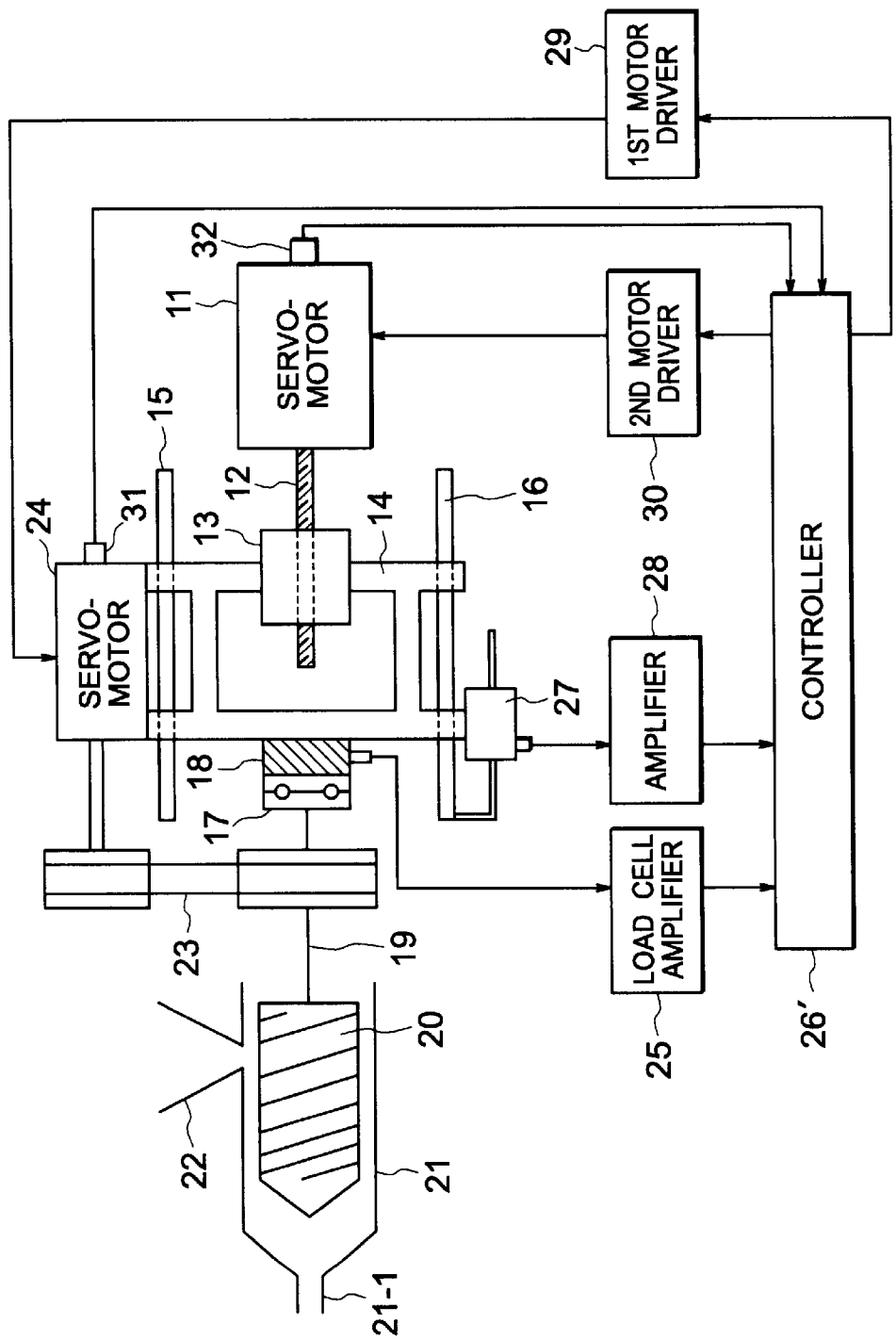
FIG. 1 is a schematic view of a conventional motor-driven injection molding machine which comprises an injection device driven by servomotors.

Referring to FIG. 1, a conventional motor-driven injection molding machine will be described at first in order to facilitate an understanding of the present invention. The illustrated motor-driven injection molding machine carries out a filling of molten resin by converting rotational motion of a servomotor into linear or reciprocating motion using a ball screw and a nut.

In FIG. 1, rotation of an injection servomotor 11 is transmitted to a ball screw 12. A nut 13 is fixed to a pressure plate 14 such that it advances and is retracted in response to the rotation of the ball screw 12. The pressure plate 14 is movable along guide bars 15 and 16 fixed to a base frame (not shown). The back and forth movement of the pressure plate 14 is transmitted to a screw 20 via a bearing 17, a load cell 18, and an injection shaft 19. The screw 20 is disposed within a heating cylinder 21 such that it is rotatable and movable in the axial direction. The heat cylinder 21 corresponding to the rear portion of the screw 20 is provided with a hopper 22 for feeding resin powder. The rotational motion of a screw-rotation servomotor 24 is transmitted to the injection shaft 19 via a coupling member 23 comprised of, for example, a belt and a pulley. In other words, the screw 20 rotates as a result that the injection shaft 19 is rotationally driven by the screw-rotation servomotor 24.

During a plasticization and metering process, molten resin is trapped in the heating cylinder 21 at the head of the screw 20, namely, on the side of a nozzle 21-1 when the screw 20 goes back while rotating in the heating cylinder 21. The molten resin in the front of the screw 21 is then filled in a mold (not shown) and pressurized for molding. Force acting upon the molten resin is detected by the load cell 18 as reaction force, namely, pressure. The load cell 18 produces a pressure detected signal indicative of the pressure. The pressure detected signal is amplified by a load cell amplifier 25 into an amplified pressure signal which is then supplied to a controller 26'.

Attached to the pressure plate 14, a position detector 27 detects an amount of movement of the screw 20 to produce a position detected signal indicative of the amount of the movement of the screw 20. The position detected signal is amplified by a position amplifier 28 into an amplified position signal which is then supplied to the controller 26'. The controller 26' supplies first and second current (torque) commands to first and second motor drivers 29 and 30 depending on desired values set by an operator.

Responsive to the first current (torque) command, the first motor driver 29 controls a rotation speed of the screw-rotation servomotor 24 by means of controlling a first driving current for the screw-rotation servomotor 24. Responsive to the second current (torque) command, the second motor driver 30 controls a rotation speed of the injection servomotor 11 by means of controlling a second driving current for the injection servomotor 11. The screw-rotation servomotor 24 is provided with a first encoder 31 for detecting a first rotation speed of the screw-rotation servomotor 24 to produce a first rotation speed signal indicative of the first rotation speed. Likewise, the injection servomotor 11 is provided with a second encoder 32 for detecting a second rotation speed of the injection servomotor 11 to produce a second rotation speed signal indicative of the second rotation speed. The first and the second rotation speed signals are supplied to the controller 26'. In particular, the first rotation speed detected by the first encoder 31 is used for determining a rotation speed of the screw 20.

It is noted that the configuration illustrated in FIG. 1 is for the sake of simplicity and convenience. A specific configuration of this example injection device is described in, for example, Japanese Unexamined Patent Publication of Tokkai No. Hei 9-174,626 or JP-A 9-174,626 which are hereby incorporated by reference.

Figures 2A, 2B:
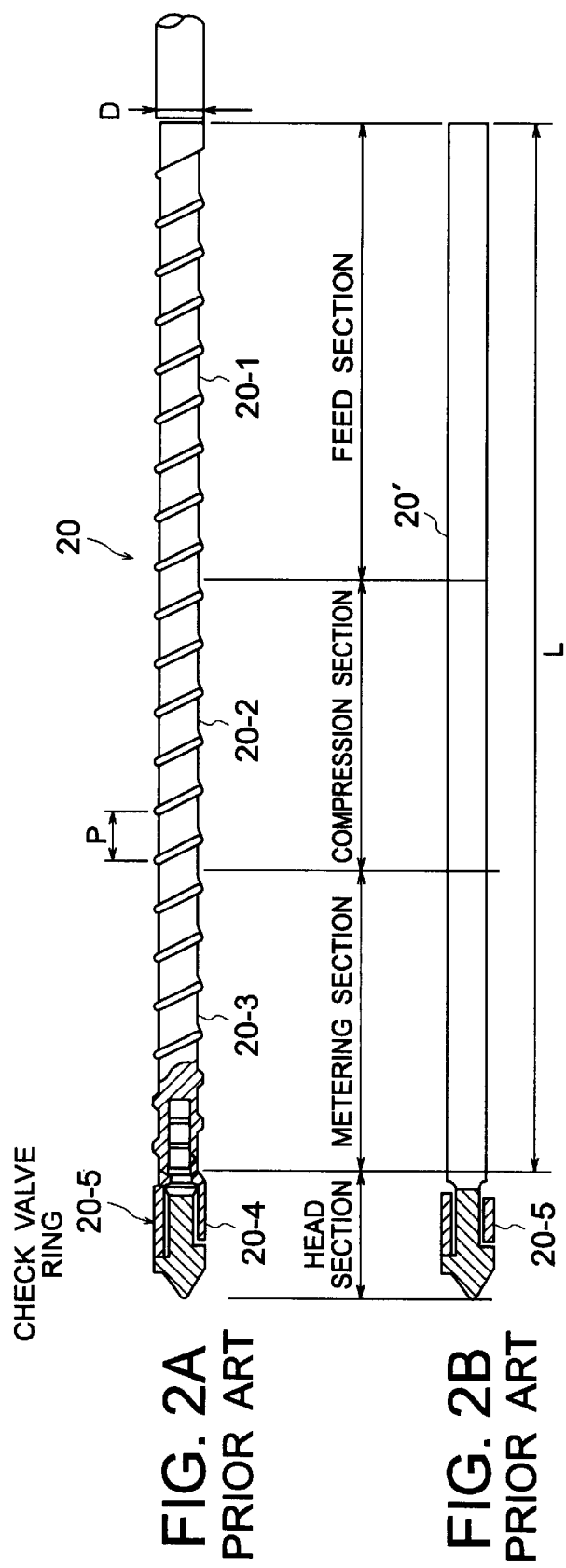
FIGS. 2A and 2B are explanatory views collectively showing a configuration of a screw for use in the conventional motor-driven injection molding machine illustrated in FIG. 1.

Referring to FIGS. 2A and 2B, description will proceed to the screw 20 in detail. As shown in FIG. 2A, the screw 20 is formed of four sections: a feed section 20-1, a compression section 20-2, a metering section 20-3, and a head section 20-4. The feed section 20-1 is for feeding the resin powder from the hopper 22 (FIG. 1) ahead a solid state or a partially molten state. The resin has temperature which is increased up to around a molten point at the feed section 20-1. Under the circumstances, the feed section 20-1 typically has a rod-shaped member 20' (FIG. 2B) of a generally constant diameter along the length thereof and a helical groove in the peripheral surface thereof.

Supplied from the feed section 20-1 to the compression section 20-2, the resin powder comprises a lot of resin grains which are spaced apart from each other. As a result, molten resin in the compression section 20-2 has an approximately half the volume of the resin powder. The compression section 20-2 is for reducing the space through which the resin powder is allowed to pass, in order to make up for the reduced volume. This compression can be achieved by means of tapering the rod-shaped member 20' at the position corresponding to the compression section 20-2 to make the helical groove shallow. The compression section 20-2 compresses the molten resin, enhances an exothermic effect caused by friction, and increases the pressure of the molten resin to push back to the hopper 22 air in the heating cylinder 21, moisture and volatile gas contained in the air and contaminated in the molten resin. As is apparent from the above-description, the heat cylinder 21 has the resin pressure of the highest level in the compression section 20-2.

The rod-shaped member 20' has the largest diameter in a region corresponding to the metering section 20-3. The metering section 20-3 has the shallowest helical groove formed in the rod-shaped member 20'. The molten resin is subjected to large shearing force in the metering section 20-3 and is heated to uniform temperature with an internal exothermic reaction. A predetermined amount of the molten resin is then fed towards the nozzle side in the heating cylinder 21.

The feeding of the molten resin from the metering section 20-3 to the nozzle side is performed through a check valve ring 20-5 in the head section 20-4. The check valve ring 20-5 is located at a position in the vicinity of the left-hand side in the figure during the metering process. In this state, the molten resin can be fed from the metering section 20-3 to the nozzle side.

After the completion of the metering process, the check valve ring 20-5 moves towards the right-hand side in the figure because of a pressure difference. As a result, the molten resin is prevented from flowing back away from the nozzle side to the metering section 20-3. The head section 20-4 is typically formed separately from the rod-shaped member 20'. The head section 20-4 has a male thread formed in the root portion thereof. The rod-shaped member 20' has a female thread formed in an end thereof. The head section 20-4 is coupled to the rod-shaped member 20' by means of engaging the male thread formed in the head section 20-4 with the female thread formed in the rod-shaped member 20'. To this end, the root portion of the head section 20-4 is significantly smaller in diameter than the rod-shaped member 20'.

At any rate, it is important for the plasticization and metering process that accurate position and pressure are achieved. This may be theoretically realized by stopping the rotation of the screw 20 with the screw positioned at a predetermined constant stroke position. However, in practice, it is difficult to realize this in the manner which will later be described.

It will be assumed that the screw position is controlled so as to position the screw position at a time instant where the plasticization and metering process is completed. Although retreat of the screw 20 stops at the time instant where the plasticization and metering process is completed, the molten resin is fed to the nozzle side through the check valve ring 20-5 caused by residual pressure in the heating cylinder 21 at the compression section 20-2 of the screw 20. This state is illustrated in FIGS. 3A through 3C.

FIG. 3A shows a waveform of a rotation speed N of the screw 20 while FIG. 3B shows a waveform of a retreat speed V of the screw 20. In addition, FIG. 3C shows a waveform of the back pressure P of the molten resin within the heating cylinder 21 that is metered ahead of the screw 20. As shown in FIG. 3B, a retreat of the screw 20 stops at a time instant T1 by controlling the position the screw 20, namely, the retreat speed V of the screw 20 is set equal to zero. However, the rotation speed N of the screw 20 does not become to zero after the time instant T1 as illustrated in FIG. 3A. As a result, the back pressure P of the metered molten resin within the heating cylinder 21 increases after the time instant T1 as illustrated in FIG. 3C.

In order to prevent this, it is proposed that a pressure control is carried out after the completion of the plasticization and metering process. This state is illustrated in FIGS. 4A through 4C.

FIG. 4A shows a waveform of the rotation speed N of the screw 20 while FIG. 4B shows a waveform of the retreat speed V of the screw 20. In addition, FIG. 4C shows a waveform—of the back pressure P of the metered molten resin within the heating cylinder 21. In FIGS. 4A through 4C, the plasticization and metering process is completed at the time instant T1 in the similar manner as illustrated in FIGS. 3A through 3C. After the completion of the plasticization and metering process, the back pressure P of the metered molten resin within the heating cylinder 21 is monitored and then the pressure control is carried out so as to control the back pressure P of the metered molten resin within the heating cylinder 21 at a constant as illustrated in FIG. 4C. However, this pressure control is actually realized to make the screw 20 go back as illustrated in FIG. 4B. This results in an inaccurate screw position before the filling process. In addition, filling amount of the molten resin, a filling time interval, are varied from desired levels, lowering a quality of molding.

Furthermore, depressurization due to suck back may be carried out on and immediately after the completion of the plasticization and metering process. By this depressurization, the screw position is determined in the similar manner as illustrated in FIGS. 3A through 3C. However, the molten resin leaks to the nozzle side through the check valve ring 20-5 caused by a residual higher pressure in the heating cylinder 21. In addition, in as much as such residual pressure is not constant, it cannot be previously taken into consideration; variations in a leakage amount from heating cylinder 21 through check valve ring 20-5 to the nozzle side varies for each injection molding and it results in an inaccurate metered amount.

Figure 5:
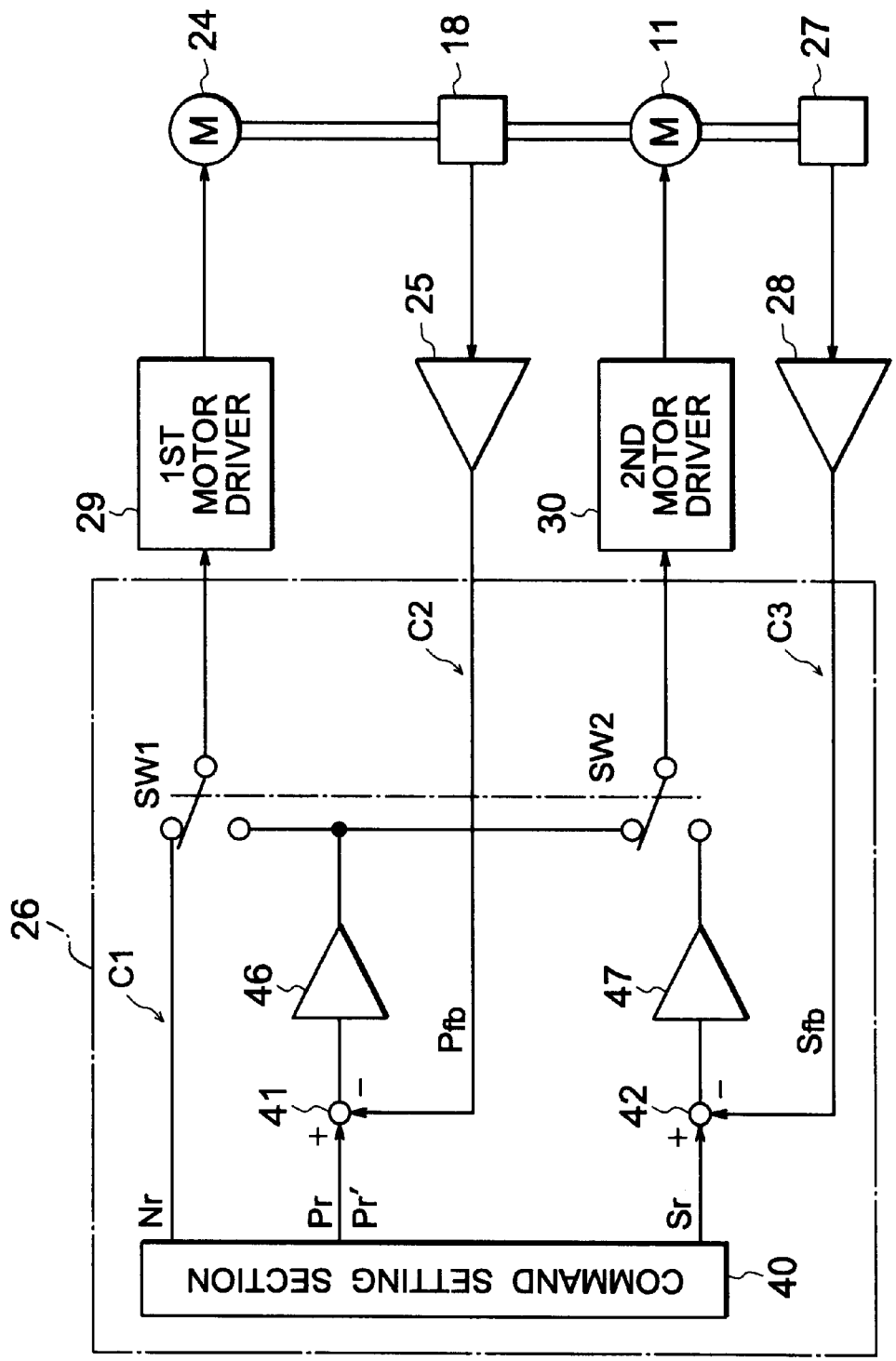
FIG. 5 is a block diagram of a control system for use in an injection device comprising a screw-rotation servomotor and an injection servomotor according a first embodiment of this invention.

Referring to FIG. 5, description will proceed to a control system for the screw-rotation servomotor 24 and the injection servomotor 11 in the motor-driven injection molding machine according a first embodiment of the present invention. The illustrated control system comprises first through third control subsystems C1, C2, and C3 which are called a rotation speed open loop control subsystem, a pressure feedback loop control subsystem, and a position feedback loop control subsystem, respectively.

The rotation speed open loop control subsystem C1 is a control subsystem for controlling the screw-rotation servomotor 24 in response to a screw rotation speed command value $N_r$ for the screw 20. The pressure feedback loop control subsystem C2 is a control subsystem for controlling, in response to a pressure difference between a pressure command value $P_r$ and a pressure detected value $P_{fb}$, either the injection servomotor 11 or the screw-rotation servomotor 24. The position feedback loop control subsystem C3 is a control subsystem for controlling, in response to a position difference between a screw position command value $S_r$ and a screw position detected value $S_{fb}$, the injection servomotor 11.

Specifically, the controller 26 comprises a command setting section 40, first and second subtracters 41 and 42, first and second compensators 46 and 47, and first and second switches SW1 and SW2.

The command setting section 40 produces a screw rotation speed command indicative of the screw rotation speed command value $N_r$, a pressure command indicative of the pressure command value $P_r$, and a screw position command indicative of the screw position command value $S_r$. The controller 26 is supplied from the load cell 18 through the load cell amplifier 25 with the amplified pressure signal indicative of the pressure detected value $P_{fb}$. In addition, the controller 26 is supplied from the position detector 27 through the position amplifier 28 with the amplified position signal indicative of the screw position detected value $S_{fb}$.

The pressure command indicative of the pressure command value $P_r$ is supplied to the first subtracter 41 which is supplied with the amplified pressure signal indicative of the pressure detected value $P_{fb}$. The first subtracter 41 subtracts the pressure detected value $P_{fb}$ indicated by the amplified pressure signal from the pressure command value $P_r$ indicated by the pressure command to calculate the pressure difference between the pressure command value $P_r$ and the pressure detected value $P_{fb}$. The first subtracter 41 produces a first subtraction result signal indicative of the pressure difference. The first subtraction result signal is supplied to the first compensator 46. The first compensator 46 compensates the first subtraction result signal to produce a first compensated signal.

The screw position command indicative of the screw position command value $S_r$ is supplied to the second subtracter 42 which is supplied with the amplified position signal indicative of the screw position detected value $S_{fb}$. The second subtracter 42 subtracts the screw position detected value $S_{fb}$ indicated by the amplified position signal from the screw position command value $S_r$ indicated by the screw position command to calculate the position difference between the screw position command value $S_r$ and the screw position detected value $S_{fb}$. The second subtracter 42 produces a second subtraction result signal indicative of the position difference. The second subtraction result signal is supplied to the second compensator 47. The second compensator 47 compensates the second subtraction result signal to produce a second compensated signal.

The first compensated signal is supplied to the first and the second switches SW1 and SW2. The second compensated signal is supplied to the second switch SW2. The first switch SW1 is supplied with the screw rotation speed command indicative of the screw rotation speed command value $N_r$ from the command setting section 40. The first switch SW1 selects, as a first selected signal, one of the screw rotation speed command and the first compensated signal. The first switch SW1 supplies the first motor driver 29 with the first selected signal as the first actuating command. The second switch SW2 selects, as a second selected signal, one of the first and the second compensated signal. The second switch SW2 supplies the second motor driver 30 with the second selected signal as the second actuating command. In the manner which will later become clear, the first and the second switches SW1 and SW2 are interlocked with each other.

As is apparent from the above-description, a combination of the command setting section 40, the first switch SW1, the first motor driver 29, and the screw-rotation serve-motor 24 serves as the rotation speed open loop control subsystem C1. In addition, a combination of the command setting section 40, the first subtracter 41, the first compensator 46, the second switch SW2, the second motor driver 30, the injection servomotor 11, the load cell 18, and the load cell amplifier 25 acts as the pressure feedback loop control subsystem C2. A combination of the command setting section 40, the first subtracter 41, the first compensator 46, the first switch SW1, the first motor driver 29, the screw-rotation servomotor 24, the load cell 18, and the load cell amplifier 25 also acts as the pressure feedback loop control subsystem C2. Furthermore, a combination of the command setting section 40, the second subtracter 42, the second compensator 47, the second switch SW2, the second motor driver 30, the injection serve-motor 11, the position detector 27, and the position amplifier 28 is operable as the position feedback loop control subsystem C3.

The description will proceed to operation of the control system illustrated in FIG. 5. Attention will be directed to the plasticization and metering process in the motor-driven injection molding machine. During the plasticization and metering process, the first and the second switches SW1 and SW2 are put into a state as illustrated in FIG. 5. That is, the screw rotation speed command indicative of the screw rotation speed command value $N_r$ is supplied to the first motor driver 29 through the first switch SW1 as the first actuating command. In addition, the first compensated signal is supplied to the second motor driver 30 through the second switch SW2 as the second actuating command.

Under the circumstances, the rotation speed open loop control subsystem C1 carries out rotation speed control of the screw-rotation servomotor 24 by supplying the screw rotation speed command indicative of the screw rotation speed command value $N_r$ to the first motor driver 29 through the first switch SW1 as the first actuating command. In addition, the pressure feedback loop control subsystem C2 carries out pressure control of the injection servomotor 11 by supplying the first subtraction result signal indicative of the pressure difference between pressure command value $P_r$ and the pressure detected value $P_{fb}$ to the second motor driver 30 through the first compensator 46 and the second switch SW2 as the second actuating command.

It will be now assumed that the plasticization and metering process in the motor-driven injection molding machine comes to an end. In this event, the first and the second switches SW1 and SW2 are switched from the state as illustrated in FIG. 5. That is, the first compensated signal is supplied to the first motor driver 29 through the first switch SW1 as the first actuating command. In addition, the second compensated signal is supplied to the second motor driver 30 through the second switch SW2 as the second actuating command. Furthermore, the command setting section 40 produces, as the pressure command, a pressure command indicative of a depressurization target value $P_r'$ which is less than the pressure command value $P_r$ during the plasticization and metering process.

Under the circumstances, the pressure feedback loop control subsystem C2 carries out pressure control of the screw-rotation servomotor 24 by supplying, as the first actuating command, the first subtraction result signal indicative of the pressure difference between the depressurization target value $P_r'$ and the pressure detected value $P_{fb}$ to the first motor driver 29 through the first compensator 46 and the first switch SW1. In addition, the position feedback loop control subsystem C3 carries out position control of the injection servomotor 11 by supplying, as the second actuating command, the second subtraction result signal indicative of the position difference between the screw position command value $S_r$ and the screw position detected value $S_{fb}$ to the second motor driver 30 through the second compensator 47 and the second switch SW2.

At any rate, a combination of the command setting section 40, the first subtracter 41, the first compensator 66, and the first switch SW1 serves as a reverse rotating arrangement for rotating, in the response to the pressure detected signal, the screw 20 in the opposite direction by supplying the first actuating command to the first motor driver 29 on and immediately after the completion of the plasticization and metering process to carry out depressurization of the molten resin in the heating cylinder 21 that is metered ahead of the screw 20. In addition, a combination of the command setting section 40, the second subtracter 42, the second compensator 47, and the second switch SW2 acts as a positioning arrangement for positioning, in response to the position detected signal, the screw 20 at a metering position by supplying the second actuating command to the second motor driver 30 on and immediately after the completion of the plasticization and metering process.

With the control system as described above, during the plasticization and metering process, the screw-rotation servomotor 24 is controlled on the basis of the screw rotation speed command value $N_r$ to carry out a metering of the molten resin and the injection servomotor 11 is controlled on the basis of the pressure difference between the pressure command value $P_r$ and the pressure detected value $P_{fb}$ to carry out control of the back pressure of the metered molten resin in the heating cylinder 21. When the plasticization and metering process completes, the first and the second switches SW1 and SW2 are switched from the state as illustrated in FIG. 5. As a result, the position feedback loop control subsystem C3 positions the screw position so as to locate a metering position given by the screw position command value $S_r$ on and immediately after the completion of the plasticization and metering process. On the other hand, on and immediately after the completion of the plasticization and metering process, the pressure feedback loop control subsystem C2 monitors the pressure detected value $P_{fb}$ detected by the load cell 18 and carries out the depressurization of the metered molten resin within the heating cylinder 21 metered ahead of the screw 20 by making the screw 20 rotate in the opposite direction in response to the pressure detected value $P_{fb}$. The reason why the screw 20 rotates in the opposite direction is that the depressurization target value $P_r'$ given on the completion of the plasticization and metering process is less than the pressure detected value $P_{fb}$.

Strictly speaking, according to the control system illustrated in FIG. 5, the rotation speed of the screw-rotation servomotor 24 in the opposite direction is determined in accordance with the pressure difference between the monitored pressure detected value $P_{fb}$ and a predetermined value or the depressurization target value $P_r'$. In addition, the control system illustrated in FIG. 5 makes the screw 20 rotate in the opposite direction until the monitored pressure detected value $P_{fb}$ is equal to the depressurization target value $P_r'$.

Figure 6:
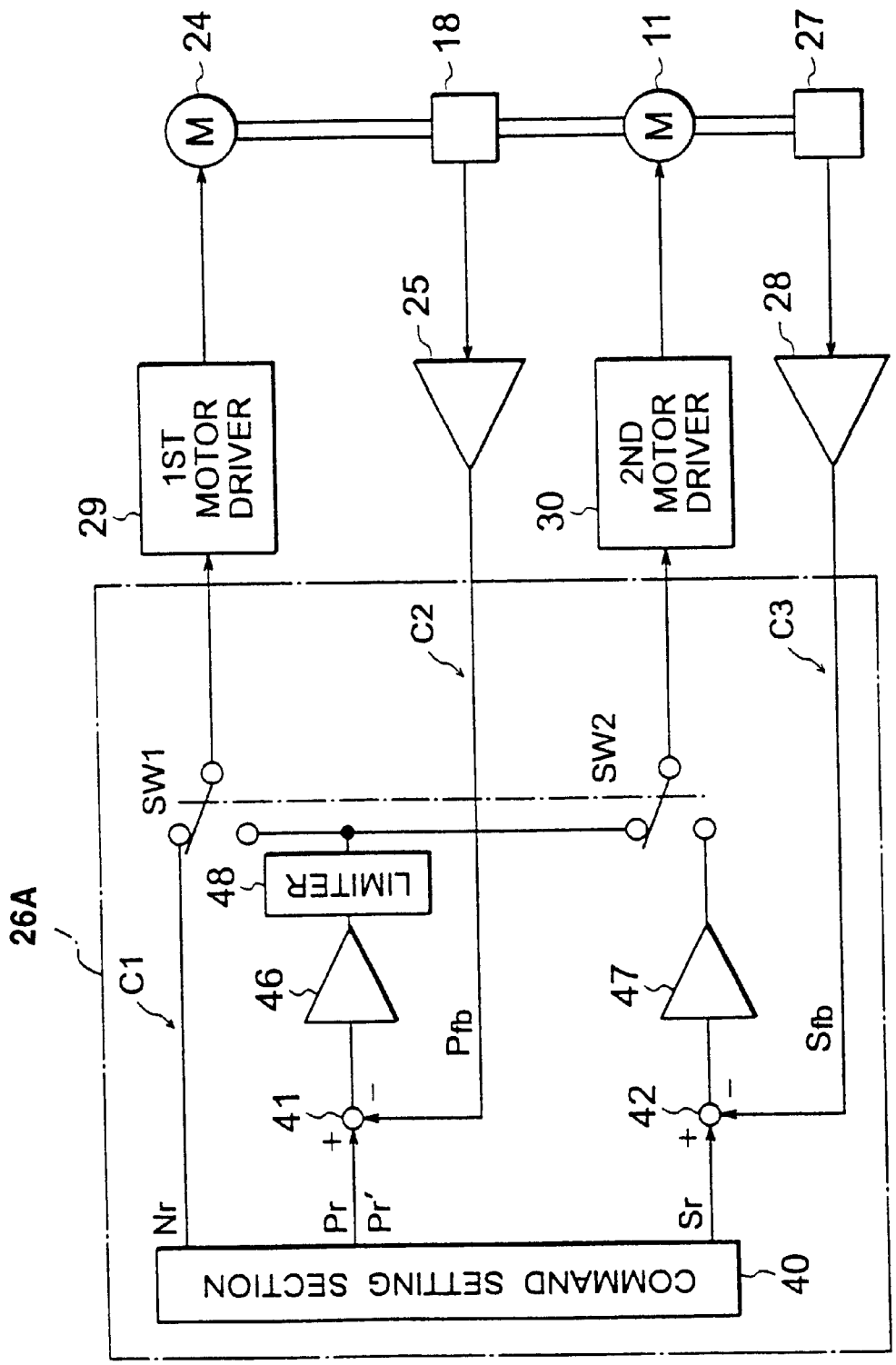
FIG. 6 is a block diagram of a control system for use in an injection device comprising a screw-rotation servomotor and an injection servomotor according a second embodiment of this invention.

In addition, the rotation speed of the screw-rotation servomotor 24 in the opposite direction may preferably be restricted to the upper limit which is preliminarily set. This is because, if the rotation speed of the screw-rotation servomotor 24 is too high, the depressurization is too large. Furthermore, a time interval for which the screw 20 rotates in the opposite direction may preferably be restricted to the upper limit which is also preliminarily set. This reason is as follows. When the back pressure of the metered molten resin within the heating cylinder 21 decreases caused by the depressurization, the check valve ring 20-5 (FIG. 2) stops the molten resin from flowing back to the metering section 20-3 side in the heating cylinder 21. At any rate, the setting of such upper limits may be achieved so that a controller 26A is provided with a limiter 48 to the output side of the first compensator 46, as a second embodiment of the present invention illustrated in FIG. 6. Supplied with the first compensated signal from the first compensator 46, the limiter 48 limits the first compensated signal to produce a limited signal. The limited signal is supplied to input terminals of the first and the second switches SW1 and SW2.

At any rate, a combination of the command setting section 40, the first subtracter 41, the first compensator 66, the limiter 48, and the first switch SW1 serves as a reverse rotating arrangement for rotating, in the response to the pressure detected signal, the screw 20 in the opposite direction by supplying the first actuating command to the first motor driver 29 on and immediately after the completion of the plasticization and metering process to carry out depressurization of the molten resin in the heating cylinder 21 that is metered ahead of the screw 20.

In the manner as described above, according to the first and the second embodiments of this embodiment, it is possible to control the back pressure of the molten resin within the heating cylinder 21, particularly, the back pressure of the metered molten resin within the heating cylinder 21 at a constant with the position of the screw 20 maintained to the metering position designated by the screw position command value $S_r$ on and immediately after the completion of the plasticization and metering process.

Figure 7:
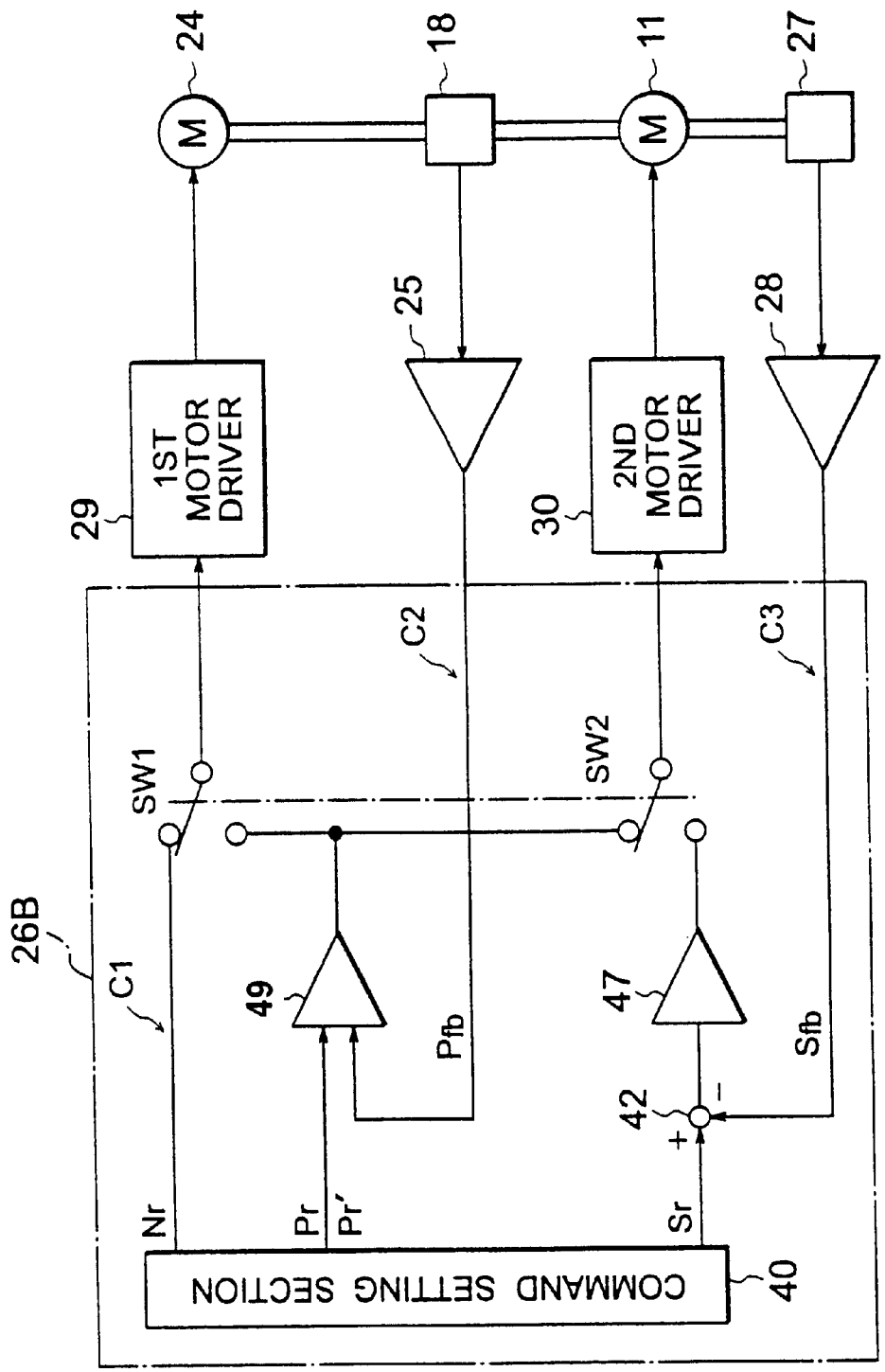
FIG. 7 is a block diagram of a control system for use in an injection device comprising a screw-rotation servomotor and an injection servomotor according a third embodiment of this invention.

Referring to FIG. 7, description will proceed to a control system for the screw-rotation servomotor 24 and the injection servomotor 11 in the motor-driven injection molding machine according to a third embodiment of the present invention. The illustrated control system is similar in structure and operation to the control system illustrated in FIG. 5 except that the controller is modified from that illustrated in FIG. 5 as will later become clear. The controller is therefore depicted as 26B. For the purpose of simplification of description, similar parts are attached with the same reference symbols and description thereof is omitted.

The controller 26B is similar in structure and operation to the controller 26 illustrated in FIG. 5 except that the controller 26B comprises a comparator 49 in place of a combination of the first subtracter 41 and the first compensator 46. The comparator 49 has a noninverting input terminal supplied with the pressure command indicative of the pressure command value $P_r$ and an inverting input terminal supplied with the amplified pressure signal indicative of the pressure detected value $P_{fb}$. The comparator 49 compares the pressure command value $P_r$ indicated by the pressure command with the pressure detected value $P_{fb}$ indicated by the amplified pressure signal to produce a comparison result signal indicative of a comparison result between the pressure command value $P_r$ and the pressure detected value $P_{fb}$. The comparison result signal is supplied to the input terminals of the first and the second switches SW1 and SW2. When the pressure detected value $P_{fb}$ is larger than the pressure command value $P_r$, the comparator 49 produces, as the comparison result signal, a signal having a logic low level. When the pressure detected value $P_{fb}$ is smaller than the pressure command value $P_r$, the comparator 49 produces, as the comparison result signal, a signal having a logic high level.

In the similar manner as described in conjunction with FIG. 5, on the completion of the plasticization and metering process, the first and the second switches SW1 and SW2 are switched from the state as illustrated in FIG. 7. In addition, the command setting section 40 produces the pressure command indicative of the depressurization target value $P_r'$. Inasmuch as the depressurization target value $P_r'$ is smaller than the pressure detected value $P_{fb}$, the comparator 49 produces, as the comparison result signal, the signal having the logic low level which is supplied to the first motor driver 29 through the first switch SW1 on and immediately after the completion of the plasticization and metering process. As a result, the screw-rotation servomotor 24 makes the screw 20 rotate in the opposite direction on and immediately after the completion of the plasticization and metering process until the pressure detected value $P_{fb}$ coincides with the depressurization target value $P_r'$. In this event, the screw-rotation servomotor 24 makes the screw 20 rotate in the opposite direction at the rotation speed having a fixed value.

At any rate, a combination of the command setting section 40, the comparator 49, and the first switch SW1 is operable as a reverse rotating arrangement for rotating, in the response to the pressure detected signal, the screw 20 in the opposite direction by supplying the first actuating command to the first motor driver 29 on and immediately after the completion of the plasticization and metering process to carry out depressurization of the molten resin in the heating cylinder 21 that is metered ahead of the screw 20.

It so emphasized that the above preferred embodiments are merely detailed examples of the invention. While this invention has thus far been described in conjunction with preferred embodiments thereof, it will now be readily possible for those skilled in the art to put this invention into practice in various manners other than the specific details disclosed with respect to these preferred embodiments. For example, the controller may be embodied in a microcomputer which simply changes the subroutines for controlling the rotation of the screw.

What is claimed is:

1. A method for operating an injection molding machine, comprising:

(a) disposing a resin powder in a heating cylinder to melt the resin powder, creating a molten resin;

(b) rotating a screw disposed in the heating cylinder in a first direction to feed the molten resin to a nozzle end of the heating cylinder and adjusting the position of the screw along the longitudinal axis of the screw to achieve a first desired pressure of the molten resin at the nozzle end of the heating cylinder; and (c) rotating the screw in the heating cylinder in a direction opposite the first direction to achieve a second desired pressure of the molten resin at the nozzle end of the heating cylinder; and said first desired pressure is greater than said second desired pressure.

2. The method of claim 1, further comprising:

(d) during step (c), controlling the position of the screw along the longitudinal axis of the screw to achieve a desired position.

3. The method of claim 1, wherein step (c) includes controlling the rotation of the screw in the direction opposite the first direction by comparing the second desired pressure of the molten resin at the nozzle end of the heating cylinder with an actual pressure of the molten resin at the nozzle end of the heating cylinder.

4. A controller for an injection molding machine, the injection molding machine including a heating cylinder to melt a resin powder to create a molten resin, a screw disposed in the heating cylinder to feed the molten resin to a nozzle end of the heating cylinder, a first motor operable to rotate the screw and a second motor operable to move the screw in a longitudinal axis of the screw, the controller comprising:

a first subtractor, having a desired pressure value representing a desired pressure of the molten resin at the nozzle end of the heating cylinder as an input, an actual pressure value representing an actual pressure of the molten resin at the nozzle end of the heating cylinder as an input, and having an output of a difference between the desired pressure and the actual pressure; and a switch connected to said output of said first subtractor, connecting said output of said first subtractor to control the second motor during a period when the molten resin is metered to the nozzle end of the heating cylinder, and connecting said output of said first subtractor to control the first motor after the period when the molten resin is metered to the nozzle end of the heating cylinder.

5. The controller of claim 4, further comprising:

a command setting section outputting said desired pressure value, wherein the command setting section lowers the desired pressure value after the period when the molten resin is metered to the nozzle end of the heating cylinder so that the first subtractor has an output to said first motor which causes the screw to rotate in a direction opposite to the direction the screw rotates during the period when the molten resin is metered to the nozzle end of the heating cylinder;

a command setting section having an output of a desired screw speed rotation command, an output of the desired pressure of the molten resin at the nozzle end of the cylinder, and an output of a desired longitudinal position of the screw; and a second subtractor, having an input of said desired longitudinal position of the screw, an input of the actual longitudinal position of the screw and an output of a difference between the desired longitudinal position and the actual longitudinal position, wherein said switch includes first and second switches, during an initial metering period, said first switch connects said output of the desired screw speed rotation to control the first motor and said second switch connects said output of said first subtractor to control the second motor, after the initial metering period, said first switch connects said output of the first subtractor to control the first motor and said second switch connects said output of said second subtractor to control the second motor.

6. A motor-driven injection molding machine comprising:

a heating cylinder for heating resin powder therein to melt the resin powder into molten resin, a screw disposed in said heating cylinder for feeding the molten resin in said heating cylinder forward to meter the molten resin to creating back pressure in the molten resin, a screw-rotation servomotor operatively coupled to said screw for rotating said screw, an injection servomotor operatively coupled to said screw for driving said screw along an axial direction to inject the molten resin metered in said heating cylinder forward, a first motor driver driving said screw-rotation, a second motor driver driving said injection, a load cell for detecting the back pressure of the molten resin in said heating cylinder to produce a pressure detected signal, a position detector for detecting a position of said screw to produce a position detected signal, and a controller controlling, in response to the pressure detected signal and the position detected signal, driving of said screw-rotation servomotor and of said injection servomotor through first and second motor drivers by supplying said first and said second motor drivers with first and second actuating commands, respectively, said controller including rotating means, connected to said load cell, for rotating said screw in a first direction during a plasticization and metering process and then, in response to the pressure detected signal, said screw in the opposite direction by supplying a first actuating command to said first motor driver on and immediately after completion of the plasticization and metering process, thereby depressurizing the molten resin in said heating cylinder that is metered ahead of said screw; and positioning means, connected to said position detector, for positioning, in response to the position detected signal, said screw at a metering position by supplying the second actuating command to said second motor driver on and immediately after the completion of the plasticization and metering process.

7. The injection molding machine of claim 6, wherein said rotating means comprises:

pressure setting means for producing a pressure command indicative of a depressurization target value on and immediately after the completion of the plasticization and metering process;

a subtracter, connected to said pressure setting means and said load cell, for subtracting the pressure detected value indicated by the pressure detected signal from the depressurization target value indicated by the pressure command to produce a subtraction result signal indicative of a pressure difference between the depressurization target value and the pressure detected value;

a compensator, connected to said subtracter, for compensating the subtraction result signal to produce a compensated signal; and supplying means, connected to said compensator and said first motor driver, for supplying said first motor driver with the compensated signal as the first actuating command on and immediately after the completion of the plasticization and metering process.

8. The injection molding machine of claim 6, wherein said rotating means comprises:

pressure setting means for producing a pressure command indicative of a depressurization target value on and immediately after the completion of the plasticization and metering process;

a subtracter, connected to said pressure setting means and said load cell, for subtracting the pressure detected value indicated by the pressure detected signal from the depressurization target value indicated by the pressure command to produce a subtraction result signal indicative of a pressure difference between the depressurization target value and the pressure detected value;

a compensator, connected to said subtracter, for compensating the subtraction result signal to produce a compensated signal;

a limiter, connected to said compensator, for limiting the compensated signal; and supplying means, connected to said limiter and said first motor driver, for supplying said first motor driver with the limited signal as the first actuating command on and immediately after the completion of the plasticization and metering process.

9. The injection molding machine of claim 6, wherein said rotating means comprises:

pressure setting means for producing a pressure command indicative of a depressurization target value on and immediately after the completion of the plasticization and metering process;

a comparator having a noninverting input terminal supplied with the pressure command signal and an inverting input terminal supplied with the pressure detected signal, said comparator comparing the pressure detected value indicated by the pressure detected signal with the depressurization target value indicated by the pressure command to produce a comparison result signal indicative of a comparison result between the depressurization target value and the pressure detected value; and supplying means, connected to said comparator and said first motor driver, for supplying said first motor driver with the comparison result signal as the first actuating command on and immediately after the completion of the plasticization and metering process.

10. The injection molding machine of claim 6, wherein said positioning means comprises:

position setting means for producing a position command indicative of a screw position command value on and immediately after the completion of the plasticization and metering process;

a subtracter, connected to said position setting means and said position detector, for subtracting the screw position detected value indicated by the position detected signal from the screw position command value indicated by the position command to produce a subtraction result signal indicative of a position difference between the screw position command value and the screw position detected value;

a compensator, connected to said subtracter, for compensating the subtraction result signal to produce a compensated signal; and supplying means, connected to said compensator and said second motor driver, for supplying said second motor driver with the compensated signal as the second actuating command on and immediately after the completion of the plasticization and metering process.

11. A motor-driven injection molding machine comprising:

a heating cylinder for heating resin powder therein to melt the resin powder into molten resin, a screw disposed in said heating cylinder for feeding the molten resin in said heating cylinder forward to meter the molten resin to creating back pressure in the molten resin, a screw-rotation servomotor operatively coupled to said screw for rotating said screw, an injection servomotor operatively coupled to said screw for driving said screw along an axial direction to inject the molten resin metered in said heating cylinder forward, a first motor driver driving said screw-rotation, a second motor driver driving said injection, a load cell for detecting the back pressure of the molten resin in said heating cylinder to produce a pressure detected signal, a position detector for detecting a position of said screw to produce a position detected signal, and a controller controlling, in response to the pressure detected signal and the position detected signal, driving of said screw-rotation servomotor and of said injection servomotor through first and second motor drivers by supplying said first and said second motor drivers with first and second actuating commands, respectively, said controller including a command setting section for producing a screw rotation speed command indicative of a screw rotation speed command value, a pressure command indicative of a pressure command value, and a screw position command indicative of a screw position command value;

a first subtracter, connected to said command setting section and said load cell, for subtracting the pressure detected value indicated by the pressure detected signal from the pressure command value indicated by the pressure command to produce a first subtraction result signal indicative of a pressure difference between the pressure command value and the pressure detected value;

a first compensator, connected to said first subtracter, for compensating the first subtraction result signal to produce a first compensated signal;

a second subtracter, connected to said command setting means and said position detector, for subtracting the screw position detected value indicated by the position detected signal from the screw position command value indicated by the position command to produce a second subtraction result signal indicative of a position difference between the screw position command value and the screw position detected value;

a second compensator, connected to said second subtracter, for compensating the second subtraction result signal to produce a second compensated signal;

a first switch, connected to said command setting means, said first compensator, and said first motor driver, for selecting, as a first selected signal, one of the screw rotation speed command and the first compensated signal, said first switch supplying said first motor driver with the first selected signal as the first actuating command; and a second switch, connected to said first and said second compensators and said second motor driver, for selecting, as a second selected signal, one of the first and the second compensated signals, said second switch supplying said second motor driver with the second selected signal as the second actuating command.

12. The injection molding machine of claim 11, wherein said command setting section produces the pressure command indicative of a depressurization target value on and immediately after completion of a plasticization and metering process, said first switch producing the screw rotation command as the first selected signal during the plasticization and metering process, said first switch producing the first compensated signal as the first selected signal on and immediately after the completion of the plasticization and metering process, said second switch producing the first compensated signal as the second selected signal during the plasticization and metering process, said second switch producing the second compensated signal as the second selected signal on and immediately after the completion of the plasticization and metering process.

13. The injection molding machine of claim 11, further comprising:

a limiter interposed between said first compensator and said second switch, for limiting the first compensated signal.

14. The injection molding machine of claim 11, further comprising:

a compensator, interposed between said subtracter and said second switch, for compensating the second subtraction result signal.

* * * * *